United States Patent Office 3,461,137
Patented Aug. 12, 1969

3,461,137
SULFUR-CONTAINING CARBAMATE
INSECTICIDES
Edward D. Weil, Lewiston, and Hans L. Schlicting,
Grand Island, N.Y., assignors to Hooker Chemical
Corporation, Niagara Falls, N.Y., a corporation of
New York
No Drawing. Original application Feb. 19, 1963, Ser. No.
259,755, now Patent No. 3,349,115, dated Oct. 24, 1967.
Divided and this application Oct. 23, 1967, Ser. No.
688,293
Int. Cl. C07d 73/00; A01n 9/12
U.S. Cl. 260—327            3 Claims

ABSTRACT OF THE DISCLOSURE

Insecticidal compounds of the formula

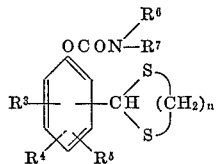

wherein $R^3$, $R^4$ and $R^5$ are either hydrogen, lower alkyl or lower alkoxy, $R^6$ is hydrogen or lower alkyl, $R^7$ is a lower alkyl substituent and $n$ is from 1 to 4. The insecticidal compounds are made by reaction of the corresponding substituted or unsubstituted aldehyde with the appropriate thiol in a suitable solvent in the presence of hydrogen chloride, after which the product is converted to the carbamate by reaction with an isocyanate, usually in the presence of a suitable catalyst, such as a strong tertiary amine or an organo tin salt.

---

This is a division of our parent application, Ser. No. 259,755, filed Feb. 19, 1963, now U.S. Patent 3,349,115, issued Oct. 24, 1967.

This invention relates to new and useful insecticidal compounds. These compounds may be described by the general formula:

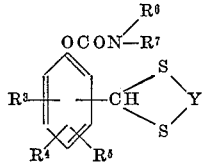

wherein Y is a divalent lower alkylene radical, or two monovalent radicals $R^1$ and $R^2$; $R^1$ and $R^2$ are alkyl groups of up to 6 carbon atoms, substituted alkyl of up to 6 carbon atoms, phenyl, lower alkyl phenyl, benzyl, lower alkylbenzyl, halophenyl, and halobenzyl substituents; $R^3$, $R^4$, and $R^5$ are hydrogen, lower alkoxy, or lower alkyl substituents; $R^6$ is a hydrogen or lower alkyl substituent; and $R^7$ is a lower alkyl substituent.

Thus embraced within the present generic invention are the subgeneric compositions:

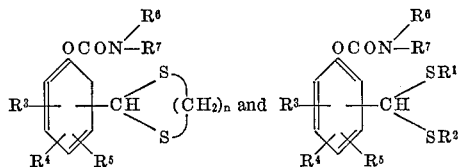

wherein the R groups are as previously defined and $n$ is a number from one to four.

By the term "substituted" as applied to lower alkyl is meant substituted by a vinyl, lower alkoxy, chlorine, carboalkoxy, or hydroxy substituent.

The term "lower" as applied to alkyl or alkylene groups in the present application means such a group containing up to four carbon atoms.

The α,α-bis(alkylmercapto)methyl group

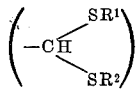

may be in the ortho, meta, or para position with respect to the carbamate group on the central ring. $R^3$, $R^4$ and $R^5$ may then be substituted on open positions of the ring to form a total of four substituents thereupon, not including the carbamate, and only one of the four should be in an ortho position with respect to the carbamate group.

Examples of compounds included within the scope of the invention are the N-methylcarbamates and N,N-dimethyl carbamates of the following salicylaldehyde mercaptals: dimethyl mercaptal, diethyl mercaptal, dipropyl mercaptal, diisopropyl mercaptal, di-n-butyl mercaptal, diisobutyl mercaptal, di-sec-butyl mercaptal, diamyl mercaptal, dihexyl mercaptal, dicyclohexyl mercaptal, diallyl mercaptal, diphenyl mercaptal, ditolyl mercaptal, dixylyl mercaptal, di(p-chlorophenyl) mercaptal, dibenzyl mercaptal, di-p-chlorobenzyl mercaptal, and di-2,5-dichlorobenzyl mercaptal; also the N-methylcarbamates and N,N-dimethylcarbamates of the cyclic mercaptals from salicylaldehyde and ethane-1,2-dithiol, propane-1,2-dithiol, propane-1,3-dithiol, butane-1,2-dithiol, butane-1,3-dithiol, and butane-1,4-dithiol, for example. Also included within the scope of the invention are the corresponding mercaptals from 3, 4, or 5-methyl-, isopropyl-, or sec-butylsalicylaldehyde such as the N-methylcarbamate of 3, 4, or 5-methylsalicylaldehyde dimethyl mercaptal, 3, 4, or 5-isopropylsalicylaldehyde diethyl mercaptal, and 3, 4, or 5-sec-btuylsalicylaldehyde cyclic mercaptal from ethane-1,2-dithiol. Also included are such compounds as the following: the N-methylcarbamate of 3,5-dimethyl salicylaldehyde dimethyl mercaptal, the N-methylcarbamate, of 3,5-dimethyl salicylaldehyde cyclic mercaptal from ethane-1,2-dithiol, the N-methylcarbamate of 3,5-diisopropylsalicylaldehyde dimethyl mercaptal, and the N-methylcarbamate of 3,5-dimethyl-4-isopropylsalicylaldehyde dimethyl mercaptal.

It is preferred in the present invention that $R^1$ and $R^2$ be the same when alkyl, and it is further preferred that they be methyl groups; when conjoined, an ethylene group bridging the two sulfur atoms is preferred. $R^3$, $R^4$ and $R^5$ are preferably hydrogen, but when they are lower alkyl, methyl is preferred; when they are lower alkoxy, up to three carbon atoms in the group is preferred and still more preferred is a methoxy substituent. When $R^3$, $R^4$ and $R^5$ are halophenyl or halobenzyl, chloro-substituted compounds are preferred, although bromo compounds are also useful. $R^6$ and $R^7$ may both be alkyl groups, preferably containing not more than three carbon atoms, and more preferably are both methyl. Still more preferred is for $R^6$ to be hydrogen, and $R^7$ to be a lower alkyl, preferably containing not more than three carbon atoms, and more preferably it is a methyl substituent.

Because of exceptional activity, the most preferred embodiments of the invention are:

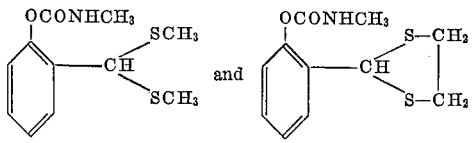

In general the compounds of the invention may be prepared by reacting aldehydes of the structure:

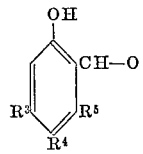

where $R^3$, $R^4$ and $R^5$ are as defined above, with at least two molar equivalents of a thiol (RSH) where R is as previously defined for $R^1$ and $R^2$, and then converting to the carbamate. The first reaction proceeds best in the presence of a strong acid catalyst such as hydrogen chloride, sulfuric acid, toluenesulfonic acid, or the like, and may be conducted with the aldehyde in the liquid phase at any temperature between about −30° to +200° C. Solvents are not necessary but may be employed. Suitable solvents are, for example, hydrocarbons such as petroleum ether, benzene, toluene, or the like, ethers such as ethyl ether, or any other solvent inert to aldehydes, to thiols, and to strong acids. The reaction proceeds with the evolution of water, which usually separates out as a different phase from the intermediate product. The conversion of the resultant phenol to the carbamate may be conducted by addition of at least one molar equivalent of a lower alkyl isocyanate, methyl isocyanate, conveniently in the presence of a catalyst such as a strong tertiary amine or an organotin salt, or by addition of at least one molar equivalent of a lower alkyl or dialkyl carbamyl chloride in the presence of one molar equivalent of an acceptor for hydrogen chloride, such as a tertiary base, or by reaction of the phenol with phosgene to obtain the chlorocarbonate followed by reaction with the corresponding amine to form the N-substituted carbamate. The compositions may also be prepared by reacting α,α'-dichloro-ortho-cresyl N-alkyl (such as methyl) carbamate with a mercaptide of the formula RSM where R is an alkyl group and M is a metal cation, e.g., sodium. The carbamate starting material may be prepared by the chlorination of ortho-cresyl N-alkyl (such as methyl) carbamate in the presence of a free radical catalyst, such as benzoyl peroxide or light.

The compounds heretofore described have utility in themselves as insecticides and as nematocides, but have further utility as intermediates in the oxidation (with $H_2O_2$) thereof to compounds of the formula:

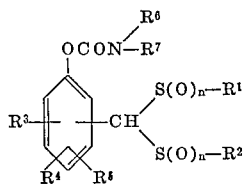

where $n$ is one or two, and the R groups are as previously defined.

Such oxidized compounds, sulfoxides and sulfones, are water soluble, whereas the parent sulfide compounds are not, and as such are preferred for use in plant systems where they are not toxic to the plant but are toxic to plant-eating pests. The present compositions may be used as such, or more generally, formulated with various adjuvants. For example, they may be used as a reaction "crude" or as the crystalline product, or may be employed by mixing it with conventional pest control adjuvants, diluents or conditioning agents, which act as inert carriers, to provide compositions in the form of solutions, emulsions, dispersions, powders dispersible in water or other solvents, dusts or the like. For example, it may be formulated with a carrier or diluent substance such as finely divided solid, a solvent of organic or inorganic origin, water, a surface active agent or aqueous emulsion or any suitable combination of one or more of any of these. For household and barn use, formulations with aerosol propellants such as the Freons are convenient.

Such formulations or compositions facilitate handling and application and frequently enhance insecticidal effectiveness.

The liquid compositions discussed generally above, whether solutions or dispersions of the active agents in a liquid solvent or a wettable powder, may contain conditioning agents such as wetting agents, dispersing agents, emulsifying agents, suspending agents and the like known generally as surface active agents. A suitable but not exhaustive listing of these surface active agents are set forth among other places in "Soap and Chemical Specialties," Vol. 31, No. 7, pages 50–61; No. 8, pages 48–61; No. 9, pages 52–67; and No. 10, pages 38–77 (1955).

Since the exact amount of insecticide in a given mixture will depend upon the type of use, species of insect, mode of formulation, mode of application, prevailing atmospheric conditions and other variables, it is not possible to state this application rate, generally with any degree of preciseness. However, where the insecticide is made up to treat crops being attacked by an insect pest, the general application rate of active insecticide will range from 0.03–10 pounds per acre with the upper rates above this figure limited by economics. In application to dwelling places and barns, a deposit of at least one mg. per square foot of surface is preferred. It may be said in passing that a diluent, conditioning agent and/or adjuvant material will usually make up the bulk of the insecticidal compositions with the active ingredient ordinarily being present on a percent weight basis of under ten percent, but generally, above about 0.005 percent.

The insecticide of the invention is compatible with other insecticides and may be used in combination with any of the insecticides, for example, such as those listed by Kenaga in the Bulletin of the Entomological Society of America, Vol. 6, No. 2, pp. 56–72 (1960), said insecticides acting to complement, supplement, synergise, or otherwise enhance the activity of the insecticide of the invention. Since an outstanding merit of the present invention is low toxicity, it is preferred to combine applicants' new compound with other insecticides and activators of low toxicity, for example, DDT, DDD, methoxychlor, isobornyl thiocyanoacetate, lauryl thiocyanate, lethanes (substituted alkyl thiocyanates), malathion, ronnel, pyrethrins, synthetic pyrethrin analogs, O,O-dimethyl 2,2-dichlorovinyl phosphate, phosdrin, lindane, texaphene, and the like. Since the compound of this invention has relatively low miticidal activity, it is advantageous to combine it with a miticide such as 1,1-bis(p-chlorophenyl)-2,2,2-trichloroethanol, p-chlorophenyl 2,4,5-trichlorophenyl sulfone, aryl alkyl sulfites, ethion, dimethoate, phorate, demeton, phosphamidon, quinoxaline trithiocarbonates, zineb, sulfur and bis(pentachlorocyclopentadienyl). The compound of the invention, because of its fast action, is useful in combination with slow-acting ingestion insecticides such as the product of melting point one hundred and forty-eight degrees from hexachlorocyclopentadiene and chlorosulfonic acid as described in U.S. Patent 2,516,404 (1951).

The insecticide of the invention may also be synergised by insecticidal synergists such as the following examples:

piperonyl butoxide.
Sesoxane(2-(3,4-methylenedioxyphenoxy)-3,6,9-trioxaundecane).
Sulfoxide (n-octyl sulfoxide of isosafrole) n-propyl isome.
Sesamine oil extractives.
Octachlorodipropyl ether.

Other synergists usable with the compound of the invention are those listed by Kenaga, loc. cit., pp. 55–56.

When combined with other active materials, it frequently is convenient to use inert solid carriers or diluents. Among the many that can be used are included clays, talcs, flours, starches, silica, mica, vermiculite, sawdust, alkaline metal carbonates, hydroxides and phosphates.

To further illustrate, without intending to limit the invention thereby, the following examples are given:

Example 1

Into a mixture of 9.4 parts of ethane-1,2-dithiol, 12.2 parts of salicylaldehyde, and 50 parts of benzene was passed a stream of hydrogen chloride gas until an exothermic reaction ensued. The hydrogen chloride stream was then stopped. After an hour, the solution was washed with aqueous sodium bicarbonate, then was dried over magnesium sulfate, filtered to remove the drying agent, and the benzene was removed by distillation, leaving the product was a pale tan-colored oil.

*Analysis.*—Calculate for $C_9H_{10}OS_2$: neutralization equivalent, 198. Found neutralization equivalent, 194.

To a solution of 5.9 parts of the above phenol in 140 parts of benzene were added 2.04 parts of methyl isocyanate and 0.05 part of dibutyltin dilaurate (catalyst). When the resultant exothermic reaction subsided, the mixture was briefly warmed to reflux, then was cooled to 20° and the resultant solids were filtered out to obtain 8 parts of colorless crystals, M.P. 142–3°.

*Analysis.*—Calculate for $C_{11}H_{13}O_2S_2N$. S, 25.1; N, 5.49. Found S, 24.5; N, 5.67.

Example 2

A solution of 9.2 parts of salicylaldehyde, 8.1 parts of 1,3-propanedithiol, 0.1 of p-toluenesulfonic acid, and 45 parts of benzene was refluxed 4 hours, then cooled and filtered. The filtrate was washed with aqueous sodium bicarbonate, dried over magnesium sulfate, filtered, and the benzene was evaporated. The product was recrystallized from benzene-heptane mixture to obtain 6 parts of light yellow crystals, M.P. 90° (decomp.).

This product was dissolved in 30 parts of benzene and 2 parts of methyl isocyanate added, as well as 0.05 part dibutyltin dilurate catalyst. After the exotherm subsided, the solution was briefly refluxed, the two volumes of heptane added, and chilled. There was obtained, upon filtration, 5.5 parts of colorless crystals.

*Analysis.*—Calculate for $C_{12}H_{15}O_2S_2N$: N, 5.2. Found: N, 5.3.

Example 3

Into a solution of 12.2 parts of salicylaldehyde, 13.6 parts of ethyl mercaptan, and 100 parts benzene, a stream of hydrogen chloride was passed for one-half hour. After four days, the solution was washed with aqueous sodium bicarbonate, then stripped to a boiling point of 100° at 0.2 mm. in a short-path still. The residual liquid was found by infrared analysis to have a phenolic OH group and no carbonyl.

*Analysis.*—Calculate for $C_{11}H_{16}OS_2$: S, 28.1. Found: S, 27.9.

A solution of 4.6 parts of this phenol, 1.5 parts of methyl isocyanate, 20 parts of benzene, and 0.01 part of Dabco (a commercial ditertiary diamine) was refluxed gently for 1 hour, then stripped to a pot temperature of 100° (10 mm.) to leave the product as a syrup. Infrared analysis confirmed the presence of the carbamate structure and the absence of the —OH group.

*Analysis.*—Calculate for $C_{13}H_{19}O_2NS_2$: N, 4.9. Found: N, 4.5.

Example 4

In the manner of Example 3, 10.6 parts of salicylaldehyde and 23.6 parts of n-butylmercaptan were reacted and the product was purified in similar manner to obtain an oil which, by infrared analysis, was free of carbonyl groups.

*Analysis.*—Calculate for $C_{15}H_{24}OS_2$: S, 22.5. Found: S, 22.6.

A solution of 5.7 parts of the above phenol, 1.5 parts methyl isocyanate, 18 parts benzene and 0.01 part dibutyltin dilaurate was refluxed gently for 1 hour, then stripped to 100° (10 mm.) leaving 6.5 parts of light colored syrup.

*Analysis.*—Calculate for $C_{17}H_2O_2NS_2$: N, 4.1. Found: N, 4.4.

Example 5

A solution of 10.6 parts of salicylaldehyde, 24.8 parts of benzyl mercaptan, and 90 parts of benzene was treated with dry HCl and let stand four days, then was stripped to 100° (0.2 mm. Hg pressure), leaving a waxy solid residue, shown by infrared analysis to be a phenolic free of carbonyl groups.

*Analysis.*—Calculate for $C_{21}H_{20}OS_2$: S, 18.17. Found: S, 18.2.

A solution of 6 parts of the above phenol, 1.5 parts of methyl isocyanate, 16 parts of benzene, and 0.02 part of dibutyltin dilaurate was gently refluxed for one hour. Then two volumes of heptane were added and the solution was partly evaporated at room temperature under vacuum until crystallization occurred. The crystals were isolated by filtration and amounted to 4 parts of colorless solid, M.P. 102–102.5° C.

*Analysis.*—Calculate for $C_{23}H_{23}O_2NS_2$: N, 3.42. Found: N, 3.41.

Example 6

A solution of 10.6 parts of salicylaldehyde and 22 parts of thiophenol in 90 parts of benzene was treated with hydrogen chloride as above. Upon stripping the product to 100° (0.2 mm. Hg pressure), there remained a viscous phenolic oil free of aldehyde groups.

*Analysis.*—Calculate for $C_{19}H_{16}OS_2$: S, 19.77. Found: S, 19.97.

A solution of 6.5 parts of the above phenol, 1.5 parts of methyl isocyanate, 18 parts benzene, and 0.02 part dibutyltin dilaurate was gently boiled one hour under reflux, then was stripped to remove the solvent. The residue was recrystallized from heptane to obtain 6 parts of colorless crystals, M.P. 100–100.5 C.

*Analysis.*—Calculate for $C_{21}H_{19}O_2NS_2$: N, 3.67. Found: N, 3.53.

Example 7

Into a solution of 21 parts of salicylaldehyde in 50 parts of benzene was passed a stream of methyl mercaptan which was first passed through a vessel containing strong hydrochloric acid to entrain a catalytic amount of hydrogen chloride. The reaction mixture underwent spontaneous heating to 60°. After one hour, the mixture was stripped to a temperature of 130° (2.5 mm. Hg pressure), leaving a phenolic oil having no aldehyde group according to infrared analysis.

To 6 parts of this intermediate was added 2 parts of methyl isocyanate in 20 parts of benzene plus 0.05 part of dibutyltin dilaurate catalyst. When the exothermic reaction subsided, the mixture was refluxed for one hour, then stripped free of solvent to leave an oil having the correct analysis for the desired carbamate.

*Analysis.*—Calculate for $C_{11}H_{15}O_2NS_2$: N, 5.4. Found: N, 5.1.

Example 8

An isomer mixture of 3-methyl- and 5-methylsalicylaldehyde (prepared by the Reimer-Tiemann reaction of chloroform with m-cresol) was treated with methyl mercaptan under the conditions of the preceding example and was worked up in the same way to obtain a light brownish oil having a phenolic group and no aldehyde carbonyl group (by infrared analysis).

To 6.5 parts of this phenol in 20 parts of benzene was added 2 parts of methyl isocyanate, 0.02 part of Dabco catalyst (description given previously) and 0.02 part of dibutyltin dilaurate. The solution was refluxed 2 hours, then was stripped free of solvent to obtain a viscous brownish oil.

*Analysis.*—Calculate for $C_{12}H_{17}O_2NS_2$: N, 5.2. Found: N, 5.0.

Example 9

Following the method of Example 7, 3,5-dimethyl salicylaldehyde was reacted with methyl mercaptan to obtain, on stripping of the solvent, a light brown waxy semi-solid which, by infrared analysis, was free of aldehyde groups and contained a phenolic —OH. To a solution of 6.5 parts of this intermediate in 25 parts of benzene was added 2 parts of methyl isocyanate, 0.01 part of Dabco, 0.01 part of dibutyltin dilaurate, and the whole was then refluxed for 3½ hours. The solvent was stripped to a pot temperature of 100° (12 mm. Hg pressure), leaving a syrup which set to a brownish waxy solid on standing at room temperature.

*Analysis.*—Calculate for $C_{13}H_{19}O_2S_2N$: N, 4.9. Found: N, 4.7.

Example 10

To a solution of 29 parts of p-chlorothiophenol in 100 parts benzene were added 12 parts of salicylaldehyde and 1 part zinc chloride. After refluxing for 3 hours, the reaction mixture was diluted with ethyl ether, washed with aqueous sodium bicarbonate, dried over calcium chloride, and evaporated to yield 35 parts of salicylaldehyde bis-(p-chlorophenyl mercaptal), M.P. 76–77° C.

*Analysis.*—Calculate for $C_{15}H_{14}OS_2Cl_2$: S, 16.29; Cl, 18.07. Found: S, 16.73; Cl, 17.9.

A solution of 8 parts of this phenol in 50 parts of benzene was treated with 2 parts of methyl isocyanate in the presence of 0.01 part of Dabco (a commercial ditertiary diamine) in the manner as described in Example 3. The residue obtained on evaporating was recrystallized from chloroform to yield 9.4 parts of the desired methylcarbamate, M.P. 159° C.

*Analysis.*—Calculate for $C_{21}H_{17}O_2S_2HCl_2$: N, 3.11. Cl, 15.78; S, 14.22. Found: N, 3.0; Cl, 15.40; S, 13.96.

Example 11

In the manner of Example 9, 3,4-diisopropylsalicylaldehyde (prepared by the reaction of 3,5-diisopropylphenol with chloroform and caustic soda) was reacted with methyl mercaptan to obtain a waxy phenolic product which, by infrared analysis, was free of carbonyl groups. Then 10 parts of this phenol plus 3 parts of methyl isocyanate were refluxed in 100 parts of benzene with 0.1 part of Dabco catalyst for 3¾ hours to obtain, on stripping, and cooling to room temperature a solid brownish cake, which, by infrared analysis, was free of phenolic —OH and exhibited —NH and C—O absorption bands.

Example 12

An emulsifiable formulation was made up by blending the following: product of Example 11, 2 pounds; polyoxyethylene ether-sodium alkyl-arylsulfonate emulsifier blend, 0.4 pound; xylene isophorone 3.1 (volume) bend to make 1 gallon. The resultant solution could be emulsified with water in any amount to prepare insecticidal emulsion sprays.

Example 13

A wettable powder formulation was made by grinding together the following ingredients in a hammer mill:

| | Parts by weight |
|---|---|
| Product of Example 1 | 50 |
| Lignin sulfonate dispersing agent | 6 |
| "Sorbit P" (arylsulfonate salt-wetting agent) | 3 |
| Attapulgus clay | 41 |

The mixture was suspended in water by slight agitation before and during spraying.

Example 14

An insecticidal dust was made by blending the following ingredients:

| | Parts by weight |
|---|---|
| Product of Example 8 | 5 |
| Attapulgus clay | 10 |
| Diluex (clay) | 85 |

Example 15

Contact insecticidal activity of representative compounds of the invention was determined by spraying aqueous dispersions of the compounds, at the concentrations indicated in the following table, onto several species of insects. The percent kill was estimated after twenty-four hours.

| | Percent kill (at concentration indicated) | | |
|---|---|---|---|
| Chemical | Mexican bean beetle | Bean aphid | Mites |
| N-methylcarbamate of— | | | |
| Salicylaldehyde dimethyl mercaptal | 100(0.1) | 100(0.0025) | 100(0.1) |
| Salicylaldehyde diethyl mercaptal | 40 | 95 | 75 |
| Salicylaldehyde diphenyl mercaptal | | 50 | |
| Salicylaldehyde di-p-chlorophenyl mercaptal | | | 99(0.1) |
| Salicylaldehyde 1,2-ethanedithiol mercaptal | 100 | 100 | |
| Salicylaldehyde 1,3-propanedithiol mercaptal | 100 | | |
| 3-, and 5-methylsalicylaldehyde dimethyl mercaptal | 100(0.1) | 100(0.1) | 100(0.1) |
| 3,5-dimethylsalicylaldehyde dimethyl mercaptal | 100(0.1) | 100(0.1) | 100(0.1) |
| Salicylaldehyde | 0(0.1) | 30(0.1) | 0(0.1) |
| p-Hydroxybenzaldehyde 1,2-ethanedithiol mercaptal | 0(0.1) | 0(0.1) | 0(0.1) |

Example 16

Systemic activity of the N-methylcarbamate of salicylaldehyde ethane 1,2-dithiol mercaptal was determined by applying 100 ml. of a 0.1% aqueous dispersion of the compound to the soil in which are planted nasturtiums infested with aphids and bean plants infested with mites. The kill of the aphids and mites was determined to be 100% at 24 and 48 hours respectively.

Example 17

Nematocidal activity of the N-methylcarbamate of salicylaldehyde ethane-1,2-dithiol mercaptal was determined by admixing the compound at 0.5 g./gallon with soli infested with *Meloidogyne incognita*. Cucumber seedlings were then planted in the treated soil, and also in some infested but untreated soil for comparison. After 10 days, the cucumber plants were uprooted and 100% repression of root lesions (root "knots") was observed relative to the untreated comparison plants.

In the foregoing examples and in the specification and claims, all parts given are by weight and all temperatures are in degrees centigrade, unless otherwise indicated.

The present invention has been described with respect to preferred examples thereof but is not to be interpreted as limited thereto and would be apparent to one of skill in the art that substitutions may be made and equivalents employed without departing from the invention or going beyond the purview of the claims.

What is claimed is:

1. A compound of the formula

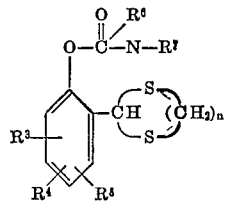

wherein $R^3$, $R^4$ and $R^5$ are independently selected from the group consisting of hydrogen and lower alkyl provided that the position ortho to the carbamate group is substituted only by hydrogen, $R^6$ is selected from the group consisting of hydrogen and lower alkyl, $R^7$ is lower alkyl, and $n$ is 1 to 4.

2. A compound of the formula

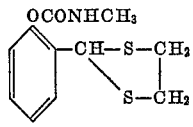

3. A compound of the formula

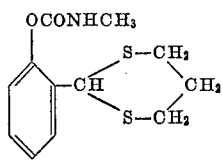

References Cited

UNITED STATES PATENTS 3,335,165   8/1967   Johnson et al. _____ 260—463

JAMES A. PATTEN, Primary Examiner

U.S. Cl. X.R.

424—277

PO-1050
(5/69)

UNITED STATES PATENT OFFICE
CERTIFICATE OF CORRECTION

Patent No. 3,461,137  Dated August 12, 1969

Inventor(s) Edward D. Weil et al.

It is certified that error appears in the above-identified patent and that said Letters Patent are hereby corrected as shown below:

Column 2, line 38, delete "5-sec-btuylsalicyl" and insert --- 5-sec-butylsalicyl --;

Column 3, line 50, delete formula, and insert

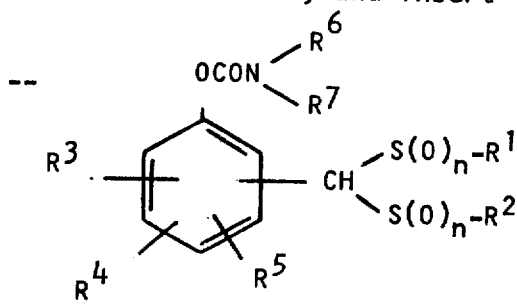

Column 4, line 13, delete "pages 38-77" and insert -- pages 38-67 --;

Column 5, line 13, delete "was a" and insert -- as a --;

(

Column 5, line 28, delete "0.1 of" and insert -- 0.1 part of --;

Column 5, line 53, delete "S, 27.9" and insert -- S, 27.5 --;

Column 6, line 1, delete "$H_2$" and insert -- $H_{27}$ --;

Column 6, line 36, delete "100-100.5 C" and insert -- 100-100.5°C --;

Column 7, line 41, delete "3,4-diiso" and insert -- 3,5-diiso --;

Column 7, line 50, delete " C-0 ", and insert -- C=0 --;

Column 7, lines 58 and 59, delete "3.1 (volume) bend", and insert -- 3:1 (volume) blend --.

UNITED STATES PATENT OFFICE
CERTIFICATE OF CORRECTION

Patent No. 3,461,137      Dated August 12, 1969

Inventor(s) Edward D. Weil et al.

It is certified that error appears in the above-identified patent and that said Letters Patent are hereby corrected as shown below:

Column 8, line 50, delete "soli" and insert -- soil --.

Column 8, line 70, Claim 1, delete formula and insert

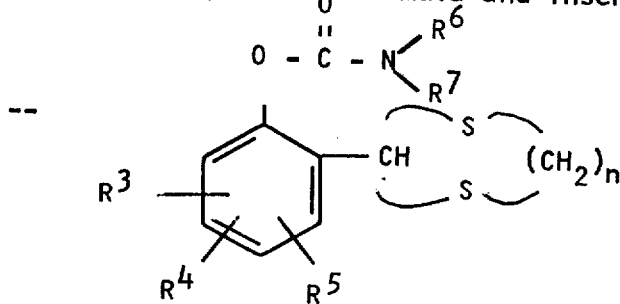

SIGNED AND SEALED
OCT 13 1970

(SEAL)
Attest:

Edward M. Fletcher, Jr.
Attesting Officer

WILLIAM E. SCHUYLER, JR.
Commissioner of Patents